(12) United States Patent
Gadalin et al.

(10) Patent No.: US 12,177,683 B2
(45) Date of Patent: Dec. 24, 2024

(54) PROVISIONING RADIO-BASED NETWORKS WITH LOCALITY RULES

(71) Applicant: Amazon Technologies, Inc., Seattle, WA (US)

(72) Inventors: Alexey Gadalin, Kirkland, WA (US); Diwakar Gupta, Seattle, WA (US); Rudresh Amin, Danville, CA (US); Yatin Patil, Redmond, WA (US); Kaixiang Hu, Fremont, CA (US); Dimitrios Elissaios, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 452 days.

(21) Appl. No.: 17/544,817

(22) Filed: Dec. 7, 2021

(65) Prior Publication Data

US 2023/0180017 A1 Jun. 8, 2023

(51) Int. Cl.
*H04W 16/18* (2009.01)
*H04W 16/14* (2009.01)
*H04W 16/22* (2009.01)

(52) U.S. Cl.
CPC ........... *H04W 16/18* (2013.01); *H04W 16/14* (2013.01); *H04W 16/22* (2013.01)

(58) Field of Classification Search
CPC . H04L 41/0869; H04L 41/0843; H04L 67/10; H04L 41/5054; H04L 47/781; H04L 49/70; H04L 9/0637; H04L 9/3247; H04L 47/83; H04L 9/3213; H04L 63/00; G06F 9/5072; G06F 11/3006; G06F 9/5094; G06F 9/505; G06F 9/5061; G06F 9/542; G06F 1/206; G06F 9/4881; G06F 2209/5021; H04W 12/04; H04W 4/08; Y04S 40/20; Y04S 40/00; Y02D 10/00
See application file for complete search history.

(56) References Cited

U.S. PATENT DOCUMENTS

| 11,716,246 | B2* | 8/2023 | Lee ........................ H04L 67/04 709/222 |
| 11,882,006 | B1* | 1/2024 | Nesteroff ................ H04L 41/12 |
| 11,917,483 | B2* | 2/2024 | Mátray ............... H04W 36/322 |
| 2016/0337179 | A1 | 11/2016 | Rao et al. |
| 2018/0077023 | A1 | 3/2018 | Zhang et al. |

(Continued)

OTHER PUBLICATIONS

International Search Report and Written Opinion for PCT/US22/80988 mailed Feb. 28, 2024.

(Continued)

*Primary Examiner* — Jung Liu
(74) *Attorney, Agent, or Firm* — Perilla Knox & Hildebrandt LLP; Thomas B. Hildebrandt

(57) ABSTRACT

Disclosed are various embodiments for provisioning radio-based networks with locality rules. In one embodiment, at least one locality rule associated with an organization is accessed. The locality rule(s) require that at least a subset of network traffic for a radio-based network remain within a particular geographic area. The radio-based network includes a radio access network and an associated core network. A topology for the radio-based network is determined based at least in part on the locality rule(s). The radio-based network is provisioned or reconfigured for the organization to have the topology complying with the at least one locality rule.

20 Claims, 11 Drawing Sheets

(56) References Cited

U.S. PATENT DOCUMENTS

| | | | |
|---|---|---|---|
| 2018/0123878 A1 | 5/2018 | Li et al. | |
| 2021/0144517 A1* | 5/2021 | Guim Bernat | H04L 41/0869 |
| 2021/0157848 A1* | 5/2021 | Doshi | G06F 18/2155 |
| 2021/0345357 A1 | 11/2021 | Ijntema et al. | |
| 2021/0360447 A1 | 11/2021 | Bor-Yaliniz et al. | |
| 2022/0078081 A1* | 3/2022 | Mahdi | H04W 40/02 |
| 2022/0124593 A1* | 4/2022 | Mátray | H04L 67/1095 |
| 2022/0150125 A1* | 5/2022 | Kumar | H04L 41/5054 |
| 2022/0191090 A1* | 6/2022 | Lee | H04L 41/0806 |
| 2022/0217610 A1 | 7/2022 | Zheng | |
| 2022/0225094 A1* | 7/2022 | Chong | H04W 12/06 |
| 2022/0264444 A1 | 8/2022 | Ryu et al. | |
| 2022/0264525 A1* | 8/2022 | Simon | H04W 72/30 |
| 2022/0294709 A1 | 9/2022 | Mannweiler et al. | |
| 2022/0400425 A1 | 12/2022 | Cakulev et al. | |
| 2023/0007483 A1* | 1/2023 | Mueck | G06Q 50/265 |
| 2023/0027736 A1* | 1/2023 | McLachlan | G06Q 30/08 |
| 2023/0075276 A1 | 3/2023 | Zhu et al. | |
| 2023/0179974 A1 | 6/2023 | Gadalin et al. | |
| 2023/0276199 A1 | 8/2023 | Ryu et al. | |
| 2023/0370330 A1* | 11/2023 | Lee | H04L 67/10 |
| 2023/0403543 A1 | 12/2023 | Pateromichelakis et al. | |
| 2024/0022469 A1* | 1/2024 | Hu | H04L 41/122 |
| 2024/0022479 A1* | 1/2024 | Arora | H04L 41/16 |
| 2024/0028766 A1* | 1/2024 | McLachlan | G06F 21/6254 |
| 2024/0045851 A1* | 2/2024 | Li | H04L 67/1097 |

OTHER PUBLICATIONS

Simone Redana et al: "5G PPP Architecture Working Group—View on 5G Architecture, Version 3.0", Jun. 19, 2019 (Jun. 19, 2019), pp. 1-166, XP055736939, DOI: 10.5281/zenodo.3265031 Retrieved from the Internet: URL: https://5g-ppp.eu/wp-content/uploads/2019/07/5G-PPP-5G-Architecture-White-Paper_v3.0_PublicConsultation.pdf [retrieved on Oct. 6, 2020] the whole document.

Final Office Action for U.S. Appl. No. 17/544,825 mailed Jul. 5, 2024.

Yoshinori Goto Nippon Telegraph and Telephone Corporation Japan: Draft Supplement 44 to Y.3100-series (formerly Suppl. To Y.IMT2020 series) "Standardization and open source activities related to network softwarization of IMT-2020"; CH vol. 21/13 Jul. 13, 2017 (Jul. 13, 2017), pp. 1-71, XP044231290.

* cited by examiner

PROVISIONING RADIO-BASED NETWORKS WITH LOCALITY RULES

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
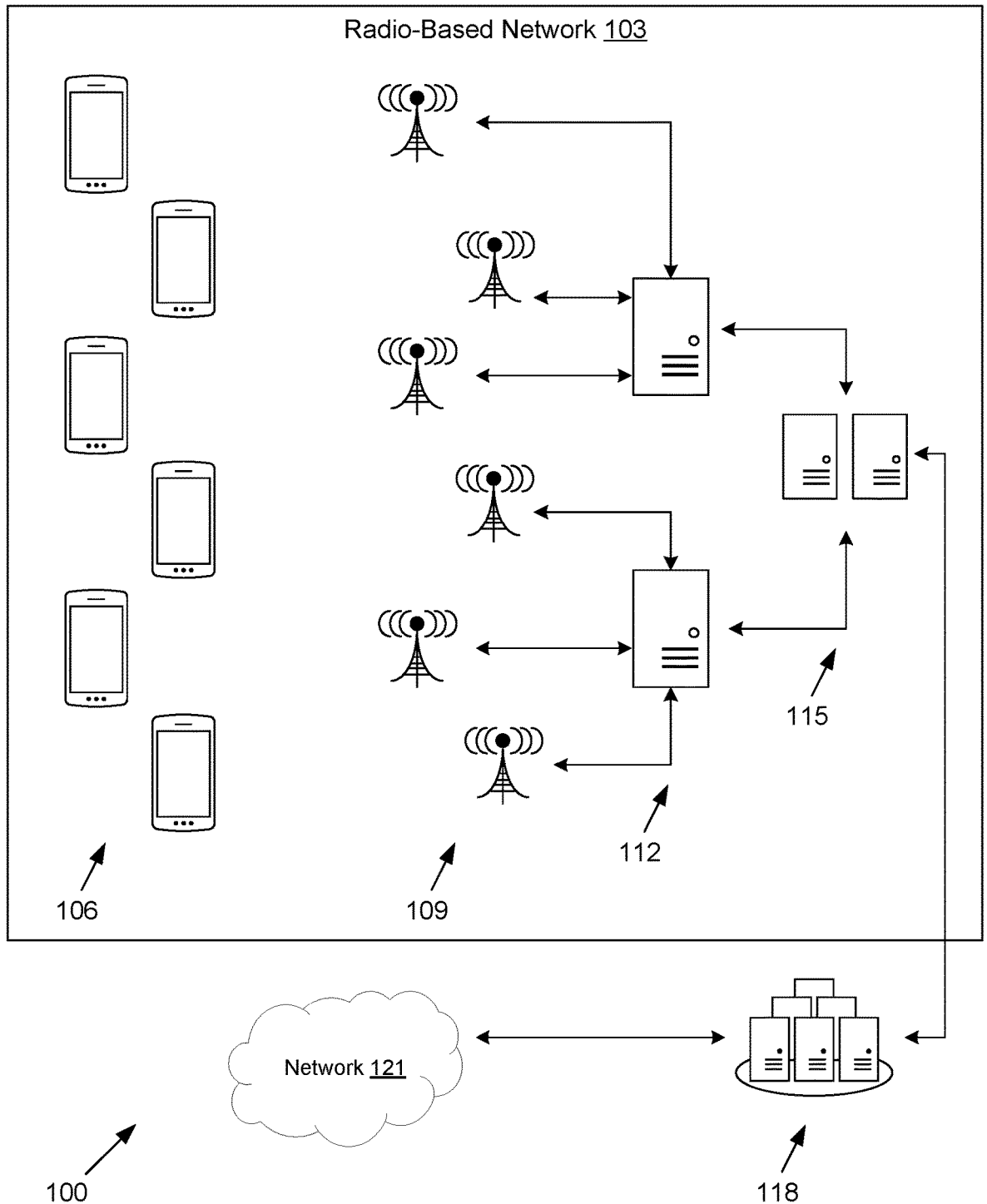
FIG. 1A is a drawing of an example of a communication network that deployed and managed according to various embodiments of the present disclosure.

The present disclosure relates to enforcing locality rules for network topologies in radio-based networks, such as 4G, 5G, and sixth-generation (6G) radio-based networks implemented at least partly by using cloud provider network infrastructure. A radio-based network can include a radio access network (RAN) and an associated core network. The radio-based networks may be deployed on behalf of a customer using the cloud provider network infrastructure in at least a partially automated way. The customer may correspond to an organization or enterprise with numerous users and user equipment that receive service from the radio-based networks. In some scenarios, the customer's radio-based network may be a private network, limited to usage by the customer's devices. In other scenarios, the customer's radio-based network may be open to external users.

Customers in a certain geographic area may have specific data locality requirements that restrict data access or data transfer only to that geographic area. A geographic area may be a single jurisdiction (e.g., one country or state) or a group of jurisdictions (e.g., the European Union) in some implementations. Such data locality requirements may be driven by data sovereignty, export controls, privacy regulations (e.g., General Data Protection Regulation (GDPR) in the European Union), security concerns, or other reasons. For example, an operator of a radio-based network in a particular country may provide a restricted service that allows users to call each other on a secure line that guarantees that the network traffic will never leave that the particular country. In order to provide such a service, the entire network topology used to make the call, including communication links, data storage services, and network functions, would need to be located in the particular country.

Various embodiments of the present disclosure introduce automated creation of radio-based networks, or slices of radio-based networks, that meet network topology locality rules. Network topology locality rules refer to rules specifying restrictions on the geographic area in which the physical network infrastructure used to create a radio-based network or network slice can be located. The present disclosure enables customers to specify network topology locality rules, for example via one or more APIs, for a radio-based network, network slice, or an application that uses the radio-based network. Customers may indicate that all network traffic or certain types of network traffic (e.g., voice calls, text messages, and/or data) are required to remain within a specified geographic area. The service can automatically restrict deployment of network functions that operate on such network traffic to the specified geographic area. In some cases, the specified geographic area may correspond to a geographic area with predefined boundaries (e.g., a country, a state, a ZIP code), while in other cases, customers may define a geographic area with arbitrary boundaries (e.g., a corporate campus). Consequently, components of the radio-based network are automatically deployed and provisioned such that communication links, data storage, and network functions are situated within the specified geographic area to support the customer's locality requirements. In some scenarios, portions of the core network are deployed on a cloud provider network that has resources both inside and outside of the specified geographic area. To meet the customer's locality requirements, resources within the specified geographic area in the cloud provider network are selected for the customer's radio-based network or network slice.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

The disclosed radio-based network service can give enterprises the best of both worlds—the performance, coverage, and QoS of a Telco-grade cellular network, with ease and cost of deployment and operation associated with Wi-Fi. The disclosed service can provide suitable hardware in different form factors that enterprises can deploy to their sites, and comes integrated with software that runs the entire network, from small cell sites to the internet break-outs. Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks.

The disclosed service supports multiple deployment scenarios. In a cloud only deployment, the service can provide small radio cells that an enterprise customer can place on site, while the network functions and other network software are run in the closest (or one of several closest) cloud provider availability zones or edge locations. These cloud provider locations can be selected based at least partly on the network topology locality rules described herein. For enterprises that want an on-premise deployment, the disclosed service provides cloud-provider hardware such as the substrate extensions described herein. In this mode, the network and applications remain on premises for the enterprise, enabling the enterprise to securely store and process data that needs to remain local (e.g., for regulatory compliance, security concerns, etc.). Further, the disclosed service can allow any compute and storage that is not being used for running the radio-based network to be used to run any local workloads via the same APIs that customers can use to run workloads in traditional cloud provider regions. Beneficially, because of this enterprises do not have to worry about being over-scaled and wasting capacity, because the service will enable any excess capacity to be used for local processing and will provision new hardware and software as the needs of the network change. Further, the disclosed service can provide application development APIs that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure provide approaches that allow customers to order and deploy a radio-based network and an associated core network in an automated way. The customers may include enterprises and organizations that wish to set up a radio-based network for internal uses (e.g., a private 5G network). Through various user interfaces, a customer may specify its network plan or requirements (for example, physical site layout and device/application types and quantities, and network topology locality rules), and the various components necessary to implement a radio-based network for the customer may be automatically determined and provisioned. Hardware, such as antennas, radios, and computer servers, may be preconfigured for the customer's radio-based network and shipped to the customer. The process of installing the preconfigured hardware is largely plug-and-play, and the radio-based network can be activated through a user interface or API. In addition to deploying a radio-based network, such as all or a portion of a new radio access network, various embodiments of the present disclosure may facilitate modification and management of the radio-based network, including the deployment of preconfigured equipment for additional cells, and the assignment of QoS constraints for particular devices or applications on their radio-based network.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. In some cases, the hardware sent to the customer include sufficient capacity to run both programs for operation and management of the radio-based network as well as other workloads of the customer (e.g., their applications), such that any capacity not used for the radio-based network can be accessible to run workloads under a utility computing model. Beneficially, the customer's radio-based network can scale up into this excess capacity as needed, for example, allowing the hardware usage requirements of the radio-based network to increase even before new physical hardware is provisioned to the customer. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

Network slicing is a capability that enables deployment and operation of multiple logical networks over a common physical network infrastructure in a way that each logical network (i.e., a network slice) can be customized and dimensioned to best serve a specific set of needs. Typically, a network slice is manually created and provided to a particular organization or business entity. According to the present disclosure, software applications running on a radio-based network can make API requests to the service to obtain a network slice that meets a set of QoS constraints and/or network topology locality rules provided for the application. In response, the service can automatically provision such a network slice for use by network traffic associated with that application. The network slice can reserve a certain amount of different hardware resources throughout the network (e.g., radio resources, RAN and core processing resources) for use by traffic associated with a particular application in order to achieve the desired QoS. The service can also manage such network slices at scale across a large number of different software applications, for example by provisioning "complementary" slices (that have complementary needs across a set of different hardware components) on the same underlying hardware for more efficient resource utilization, or by overprovisioning slices based on forecasted utilization that indicates all applicable QoS constraints can still be met.

As one skilled in the art will appreciate in light of this disclosure, certain embodiments may be capable of achieving certain advantages, including some or all of the following: (1) improving the user experience by allowing organizations to deploy their own radio-based networks in a largely automated, plug-and-play way; (2) improving flexibility in computer systems by allowing computing hardware previously dedicated to network functions in radio-based networks and associated core networks to be repurposed for other applications; (3) improving flexibility in computer systems by allowing computing hardware previously dedicated to a first radio-based network to be repurposed automatically for a second radio-based network (or to be repurposed between RAN and core network functions of the same radio-based network on an as-needed basis); (4) improving the user experience in deploying a radio-based network by preconfiguring antennas, radios, and other hardware, thereby providing a plug-and-play installation experience; (5) improving the performance of radio-based networks by optimizing deployment of cells and spectrum utilization; (6) improving the performance and management of radio-based networks by monitoring performance metrics and adding, removing, and reconfiguring cells as needed to maintain acceptable performance; (7) improving the scalability and overall performance of a radio-based network by transferring network functions previously provided by proprietary hardware to virtual machine instances operated by a cloud computing provider with elasticity under a utility computing model; (8) reducing latency in a radio-based network by transferring network functions to virtual machine instances executed on computing devices of a cloud service provider at a cell site; (9) improving flexibility of communication networks by allowing a network topology for a radio-based network to be automatically determined based at least in part on data locality requirements; (10) improving flexibility of communication networks by allowing a network topology for a network slice of a radio-based network to be automatically determined based at least in part on data locality requirements; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrates the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all the hardware, software and network functions, required to build a network. In some embodiments, the network functions may be developed and managed by the cloud service provider; however, the described control plane can manage network functions across a range of providers so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that deployed and managed according to various embodiments of the present disclosure. The communication network 100 includes a radio-based network 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for an enterprise, a non-profit, a school system, a governmental entity or other organization. Although referred to as a private network, the radio-based network 103 may use private network addresses or public network addresses in various embodiments.

Various deployments of radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based network 103 can include a radio access network (RAN) that provides the wireless network access to the plurality of wireless devices 106 through a plurality of cells 109. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

Figure 1B:
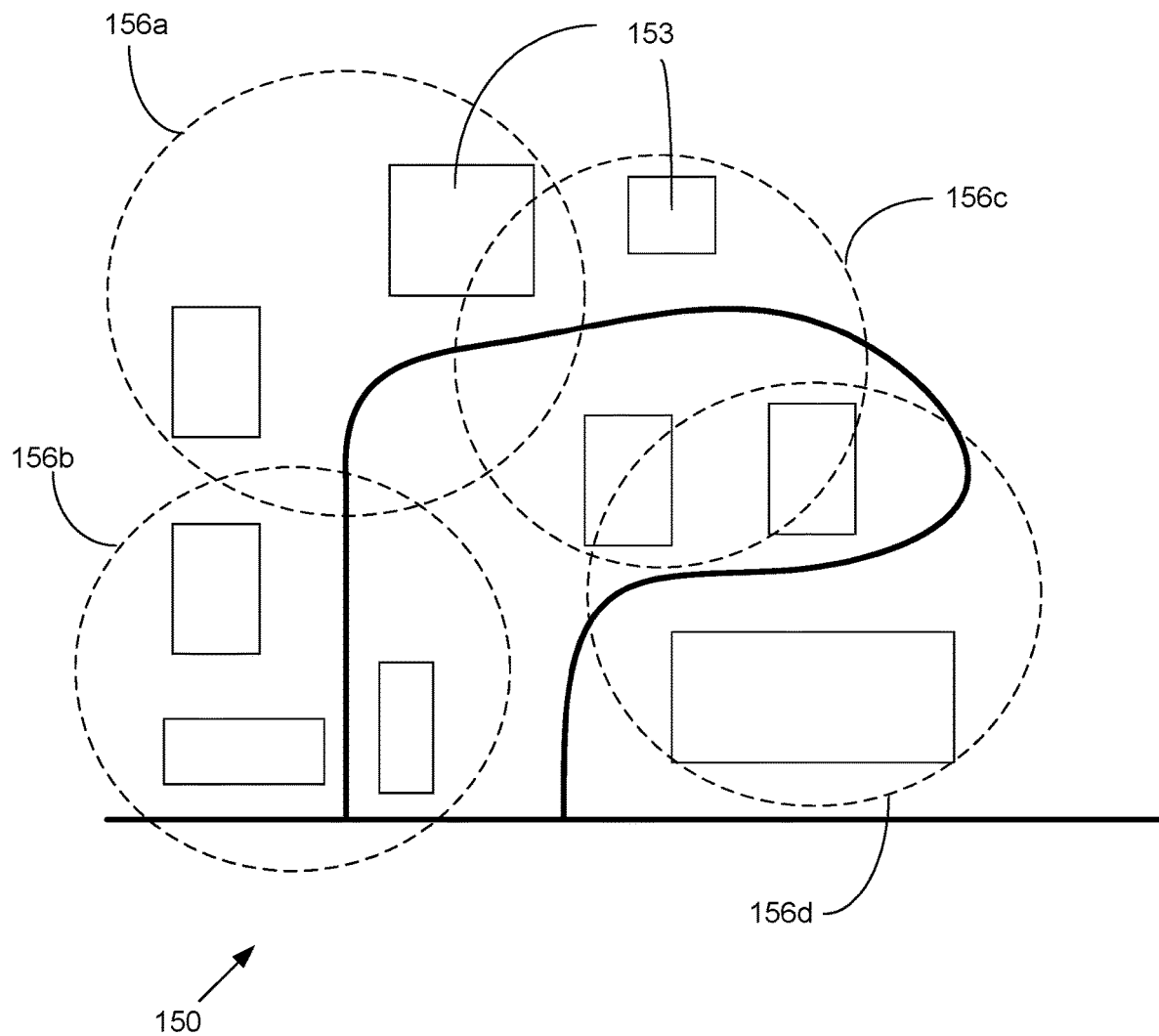
FIG. 1B is an example of a radio-based network used on an organizational campus with a plurality of buildings and deployed in accordance with various embodiments of the present disclosure.

Moving on to FIG. 1B, shown is an example of a radio-based network 150 used on an organizational campus (such as the premises of an enterprise such as a business, school, or other organization) with a plurality of buildings 153 and deployed in accordance with various embodiments of the present disclosure. Although FIG. 1B depicts an example with multiple buildings, it will be appreciated that the disclosed techniques can similarly be applied to any layout of a site, which may include one or more buildings and/or one or more outdoor spaces (such as stadiums or other outdoor venues).

The radio-based network 150 in this non-limiting example includes four cells 156a, 156b, 156c, and 156d to fully cover the organizational campus. The cells 156 may overlap somewhat in order to provide exhaustive coverage within each of the buildings 153. The adjacent or overlapping cells 156 are configured to operate with non-interfering frequencies. For example, cell 156a may use Frequency A, cell 156b may use Frequency B, and cell 156c may use Frequency C, which are all distinct frequencies as the coverage of the respective cells 156a, 156b, and 156c overlap. However, cell 156d may use, for example, Frequency A or B as the coverage of cell 156d does not overlap cell 156a or 156b.

It is noted that depending on usage or other network metrics, cells 156 may be added or removed from the radio-based network 150. In some cases, signal strength to cells 156 may be increased to reduce the number of cells 156, or lowered to increase the number of cells 156 while allowing for spectrum reuse among the cells 156. Additionally, computing capacity may be added within the geographic area of the organizational campus or within a cloud provider network in order to decrease latency, maintain security, and increase reliability, for the radio-based network 150 as desired. In some cases, computing capacity for software that implements the radio-based network 150 may be provisioned mostly or wholly in a cloud provider network and not on a customer's premises, such as in a regional data center of a cloud service provider. This software may implement various network functions such as the UPF, AMF, SMF, and so forth, that may correspond to the core network functions, central unit network functions, and distributed unit network functions. Some network functions, such as distributed unit network functions, may remain at the cell site.

Figure 2A:
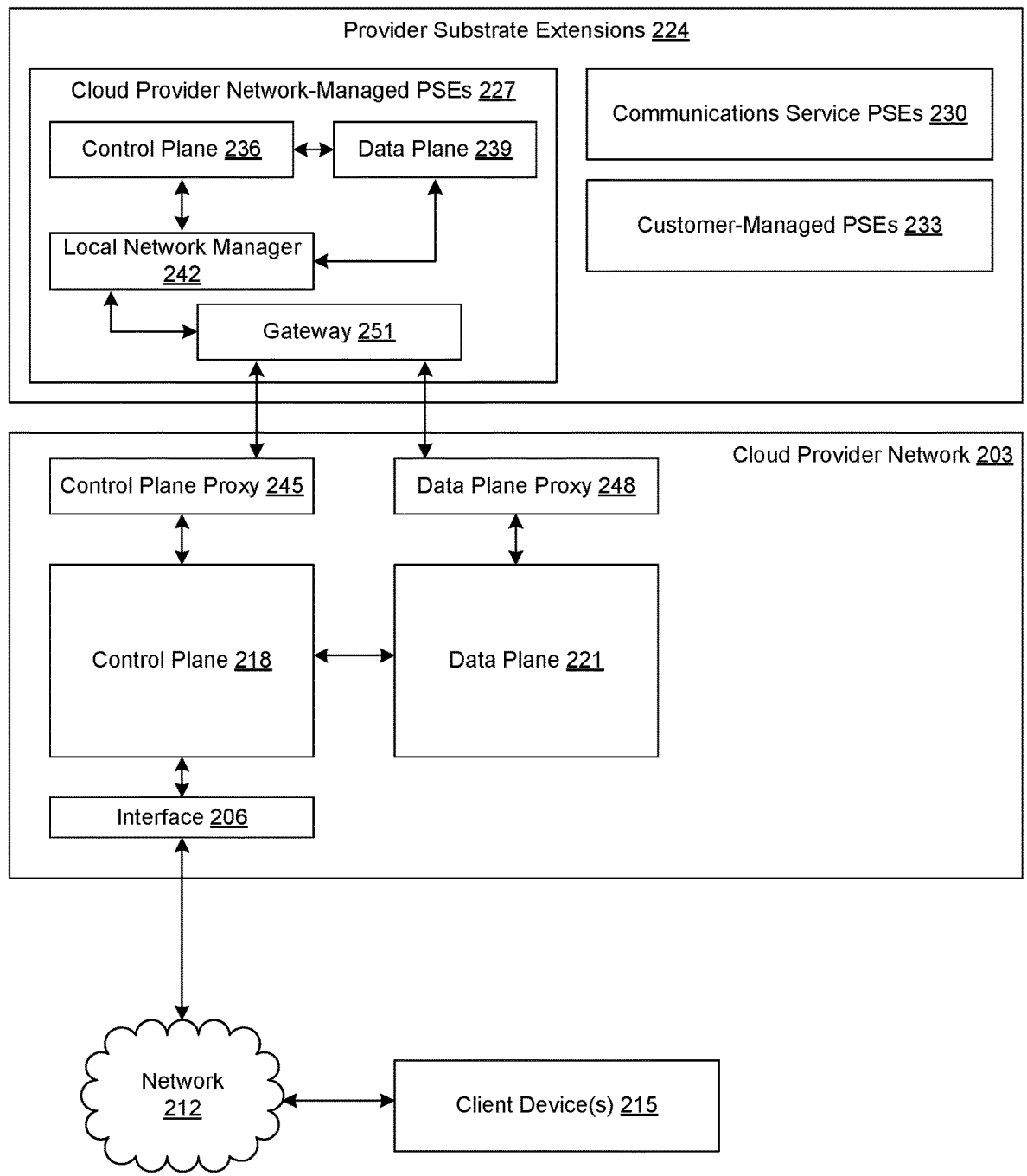
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network, which may be used in combination with on-premise customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a cloud provider-managed facility separate from those associated with the cloud provider network 203), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g., by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies so an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension will remain in the cloud provider network 203 in order to allow customers to use as much resource capacity of the provider substrate extension as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network 100 associated with respective customers. For example, when two communication networks 100 of respective customers share or route traffic through a common point, a provider substrate extension 224 can be connected to both networks. For example, each customer can assign some portion of its network address space to the provider substrate extension, and the provider substrate extension can include a router or gateway that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension to a destination on one of the networks can be similarly encapsulated to have the appropriate VLAN tag, source IP address (e.g., from the pool allocated to the provider substrate extension from the destination network address space) and destination IP address.

Figure 2B:
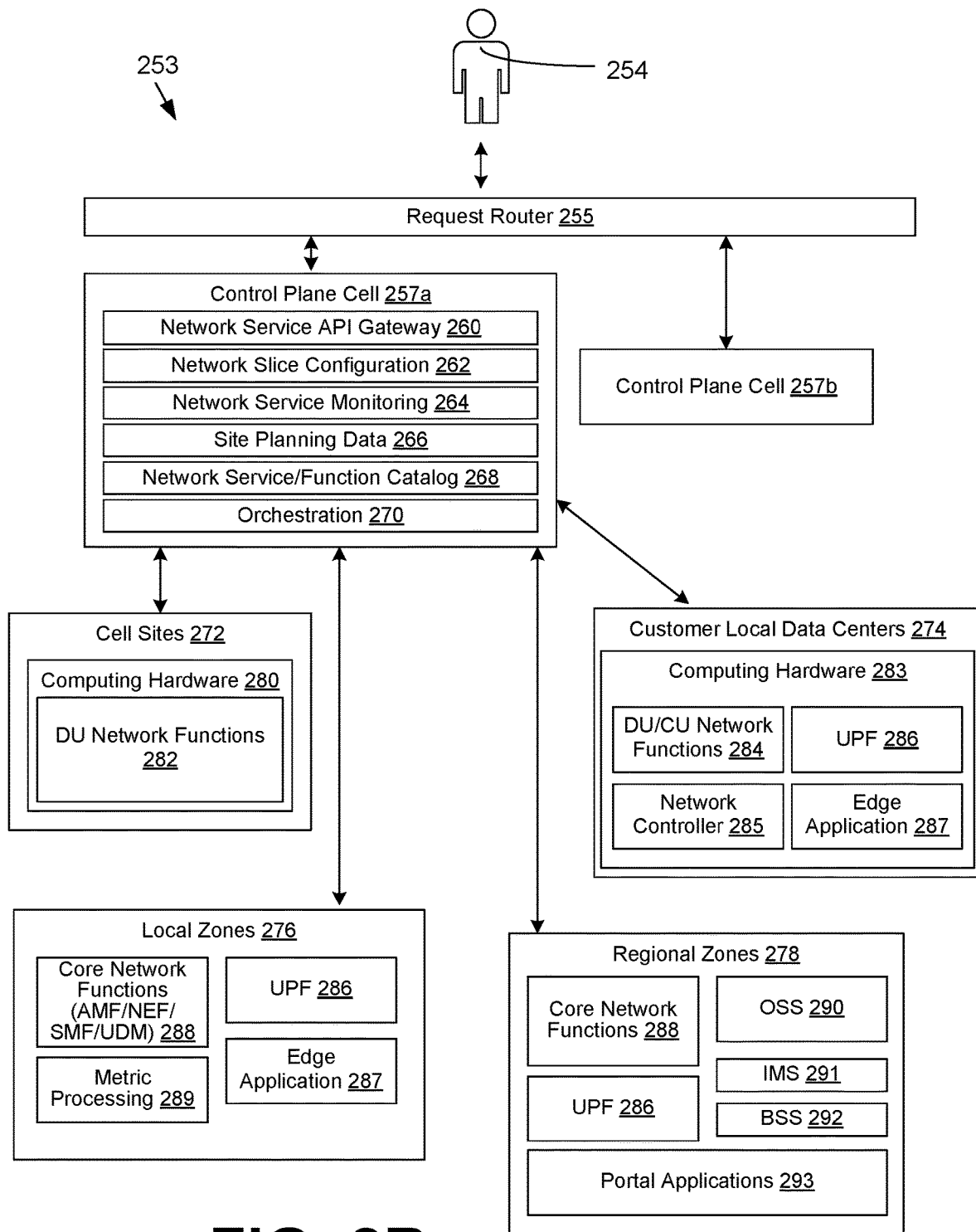
FIG. 2B depicts an example of cellularization and geographic distribution of the communication network of FIG. 1A, according to some embodiments of the present disclosure.

FIG. 2B depicts an example 253 of cellularization and geographic distribution of the communication network 100 (FIG. 1A) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc., that describe a customer's site requirements), a network service/function catalog 268, a network function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function for orchestration 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103.

The control plane cell 257 may be in communication with one or more cell sites 272, one or more customer local data centers 274, one or more local zones 276, and one or more regional zones 278. The cell sites 272 include computing hardware 280 that executes one or more distributed unit (DU) network functions 282. The customer local data centers 274 include computing hardware 283 that execute one or more DU or central unit (CU) network functions 284, a network controller, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
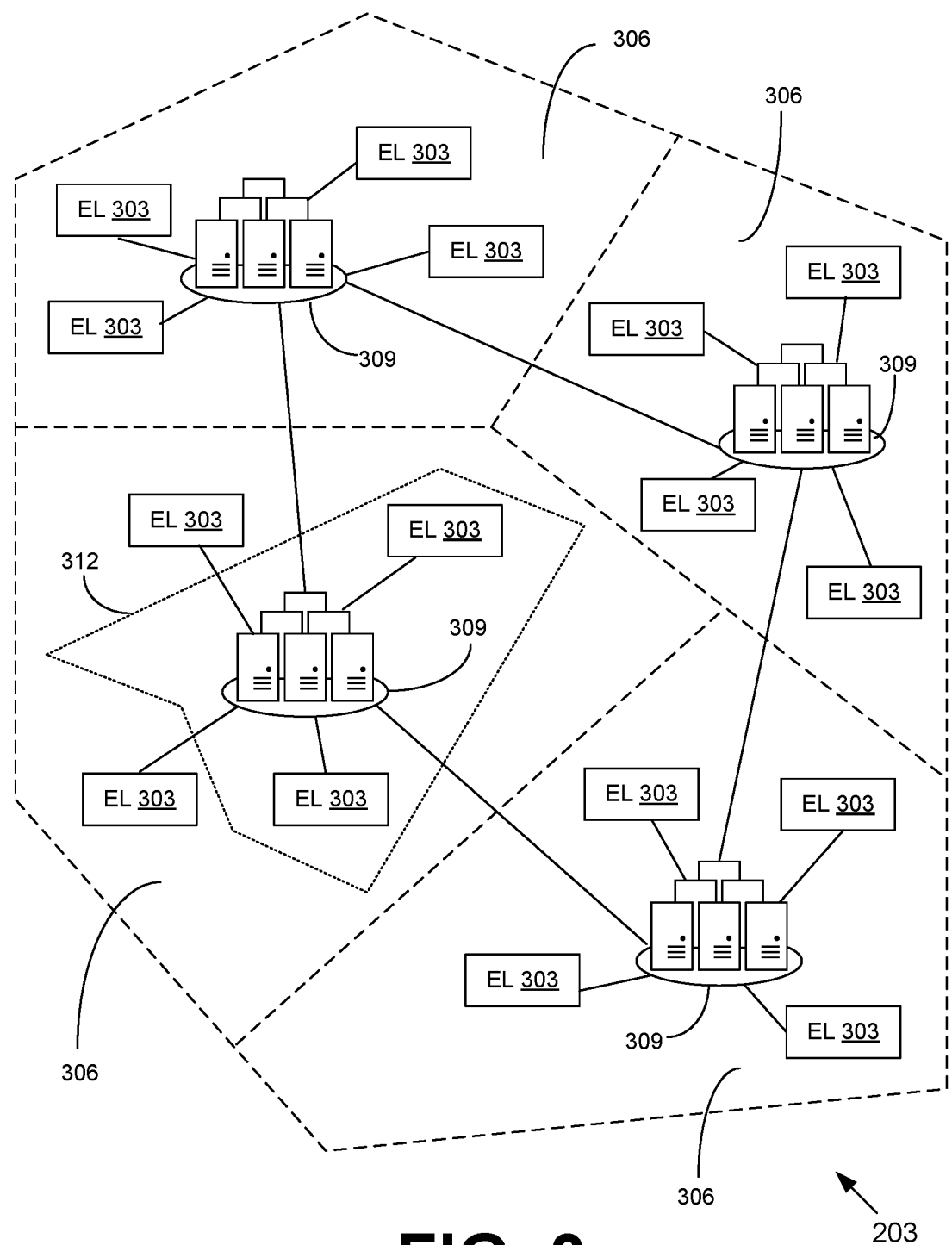
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one another such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a communication service provider network). Transit Centers (TC) are the primary backbone locations linking customers to the cloud provider network and may be co-located at other network provider facilities (e.g., Internet service providers, telecommunications providers). Each region can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network 100 in one country within that country, the edge locations 303 deployed within that communication network 100 can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network 100 has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

In some embodiments, customers may configure one or more geographic areas 312 in one or more locality rules such that data in their radio-based network 103 (FIG. 1A) is required to remain with the defined geographic area(s) 312. As shown on FIG. 3, the example geographic area 312 encompasses a portion of two regions 306, including two data centers 309 and six edge locations 303, but excluding two other edge locations 303 in the regions 306. In other words, the regions 306, edge locations 303, and communication links outside of the geographic area 312 cannot be used for processing, storing, or routing network traffic that is required to remain within the geographic area 312, such that a portion of the topology corresponding to a portion of the radio-based network 103 that handles one or more identified classes of network traffic may consist of physical hardware located within the geographic area 312. In other examples, the geographic area 312 may encompass a single region 306 or a portion of a single region 306, or more than two regions 306.

Figure 4:
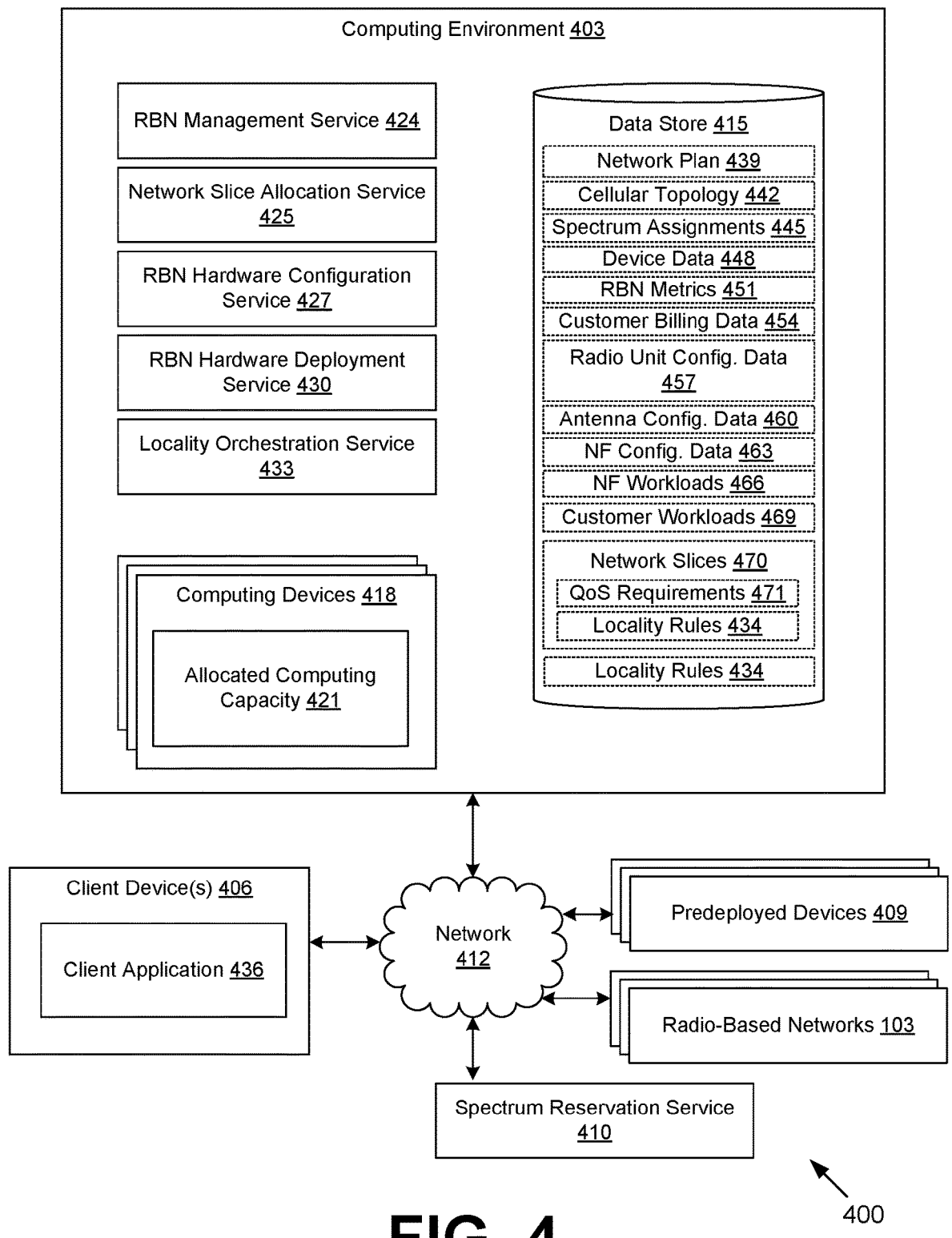
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more predeployed devices 409, a spectrum reservation service 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203 (FIG. 2A), where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing devices 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a radio-based network (RBN) management service 424, a network slice allocation service 425, a RBN hardware configuration service 427, a RBN hardware deployment service 430, a locality orchestration service 433, and other applications, services, processes, systems, engines, or functionality not discussed in detail herein.

The RBN management service 424 is executed to manage, configure, and monitor radio-based networks 103 that are operated by a cloud service provider on behalf of customers. To this end, the RBN management service 424 may generate a number of user interfaces that allow customers to place orders for new radio-based networks 103, scale up or scale down existing radio-based networks 103, modify the operation of existing radio-based networks 103, configure wireless devices 106 (FIG. 1A) that are permitted to use the radio-based networks 103, provide statistics and metrics regarding the operation of radio-based networks 103, reserve frequency spectrum for customer's private networks via a spectrum reservation service 410, allow customers to define one or more locality rules 434 and one or more geographic areas 312 (FIG. 3) to which they apply, and so on. For example, the RBN management service 424 may generate one or more network pages, such as web pages, that include the user interfaces. Also, the RBN management service 424 may support this functionality by way of an API that may be called by a client application 436. In addition to facilitating interaction with users, the RBN management service 424 also implements orchestration of deployments and configuration changes for the radio-based networks 103 and on-going monitoring of performance parameters. In some cases, the RBN management service 424 may generate a network plan 439 for a customer based at least in part in a specification of the customer's location, an automated site survey by an unmanned aerial vehicle, and/or other input parameters.

The network slice allocation service 425 is executed to allocate network slices to applications and/or client devices 406 that are connected to a RAN of a radio-based network 103 having an associated core network. As used herein, the term "network slice" refers to particular network traffic that is assigned one or more particular locality rules 434, a priority according to one or more quality-of-service requirements and/or that is provided with a hardware capacity reservation in order to receive, transmit, or manage the network traffic. The network traffic for the network slice may be identified at one or more network layers, such as the application layer (e.g., through deep packet inspection), the session layer, the transport layer, the network layer, or the data link layer. The network slices may be ephemeral, or having a specific duration in terms of time or data quantity, or may exist until released or cancelled. The network slice allocation service 425 may support an application programming interface (API) that may be called by applications on client devices 406, and/or backend services that interact with those applications, in order to request that a network slice be allocated, modified, or released. Although the network slice allocation service 425 allocates network slices on the radio-based network 103, there may be one or more devices coupled to the radio-based network 103 through one or more fixed or wired links, and the network slices determined by the network slice allocation service 425 may be applicable to such devices as well.

To allocate a network slice, the network slice allocation service 425 may dynamically configure one or more network functions in the radio-based network 103 to implement the locality rules 434 and/or quality-of-service requirements for the network traffic that meets the network slice definition. It is noted that a network slice may have a greater or lesser priority than normal traffic, which may have a corresponding cost that is higher or lower than a normal usage cost. In some scenarios, the network slice allocation service 425 may increase or decrease allocated computing capacity 421 for network function workloads in order to meet the specified quality-of-service requirement. For example, more allocated computing capacity 421 for network functions implementing the network slice may provide a lower latency. In some embodiments, the network slice allocation service 425 may also rearrange network function workloads at different points in the radio-based network 103 to meet the quality-of-service requirement.

In some embodiments, application developers or application owners can specify required network slice configuration in an application template used to deploy a particular application in the cloud provider network 203, such that the application can provide this information to the network slice allocation service 425 when making an API-based request for a network slice. In some embodiments, the network slice allocation service 425 automatically determines one or more optimal network slices for a customer's application or for their overall radio-based network 103. To this end, the network slice allocation service 425 may train one or more machine learning models to recognize network slice configurations in view of conditions for a customer or across multiple customers. The machine learning models then may be used to identify optimal network slices to be allocated for given device types or applications determined to be present in the radio-based network 103. For example, the network slice allocation service 425 may receive detailed network information or automatically probe the radio-based network 103 to understand devices, applications, latencies, usage patterns, and so forth. The network slice allocation service 425 can then provide this information to the machine learning model to automatically determine one or more network slices to optimize latency, bandwidth, reliability, or other metrics. These automatically determined network slices may then be automatically allocated by the network slice allocation service 425.

The RBN hardware configuration service 427 is executed to implement configuration changes on hardware that implements a radio-based network 103. This may include radio units, antennas, VM instances or containers that perform network functions, routers, switches, fiber termination equipment, and so on. For example, antennas may be configured for operation at specific frequencies. Radio units may be programmed to operate at specific frequencies, join a particular radio-based network 103, and backhaul traffic to a particular VM instance or container.

In some scenarios, the RBN hardware configuration service 427 is executed to reconfigure hardware already present in a radio-based network 103. In other scenarios, the RBN hardware configuration service 427 is executed to preconfigure hardware set to be deployed to existing or new radio-based networks 103. To this end, the RBN hardware configuration service 427 may implement configurations on one or more predeployed devices 409 that are temporarily connected to the network 412 to facilitate preconfiguration before the predeployed devices 409 are shipped to the customer for deployment in the radio-based networks 103.

The RBN hardware deployment service 430 is executed to automate and arrange deployment of hardware to implement a radio-based network 103. Based on a network plan 439 submitted by or generated for a customer, the RBN hardware deployment service 430 may arrange procurement for the hardware components necessary to implement a radio-based network 103 according to the network plan 439. This may involve placing orders for new equipment automatically from vendors, reserving equipment already within the inventory of the provider, or reallocating equipment already present at the customer's site or sites of other customers, where the equipment to be reallocated is no longer utilized. In this regard, the RBN hardware deployment service 430 may send a directive to customers to return equipment that is no longer utilized, where the equipment may be sent directly to other customers for use in another deployment. In another scenario, the RBN hardware deployment service 430 may send a directive to a customer to move a piece of equipment from one site where the equipment is no longer used to another site where the equipment will be used. The RBN hardware deployment service 430 may manage connection of equipment to the network 412 for preconfiguration as a predeployed device 409. The RBN hardware deployment service 430 may also arrange shipping of equipment to customer locations, including potentially a plurality of locations of the customer corresponding to respective cell sites.

The locality orchestration service 433 is executed to enforce one or more locality rules 434 configured for a customer regarding a radio-based network 103 or a network slice on a radio-based network 103. In some embodiments, the locality orchestration service 433 may be executed when a radio-based network 103 is being planned, created, or provisioned by the RBN management service 424 such that all elements in the radio-based network 103, including network functions, data storage, cell equipment, and communications links, are within one or more geographic areas 312 as defined in the locality rules 434. In other embodiments, the locality orchestration service 433 is executed when a network slice allocation service 425 allocates a network slice in a radio-based network 103 such that all elements implementing the network slice, including network functions, data storage, cell equipment, and communications links, are within one or more geographic areas 312 as defined in the locality rules 434. The locality orchestration service 433 may also be executed when resources allocated to the radio-based network 103 or network slice subject to the locality rules 434 are scaled, such that additional resources added to the radio-based network 103 or the network slice comply with the locality rules 434. In some embodiments, the locality orchestration service 433 may create one or more gateways to connect a restricted radio-based network 103 or a restricted network slice to other segments of the radio-based network 103 or the Internet, and then apply policy rules to limit and restrict the network traffic so that the customer can know and acknowledge where there are violations of the locality rules 434.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, one or more customer workloads 469, data regarding one or more network slices 470 (including one or more QoS requirements 471 and one or more locality rules 434), one or more locality rules 434, and/or potentially other data.

The network plan 439 is a specification of a radio-based network 103 to be deployed for a customer. For example, a network plan 439 may include premises, locations, or geographic areas 312 to be covered, a number of cells 109 (FIG. 1A), device identification information and permissions, a desired maximum network latency, a desired bandwidth or network throughput for one or more classes of devices, one or more quality of service parameters for applications or services, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area 312 served, based on spectrum availability, etc. In some cases, the network plan 439 may incorporate thresholds and reference parameters determined at least in part on an automated probe of an existing private network of a customer.

The cellular topology 442 includes an arrangement of a plurality of cells 109 for a customer that takes into account reuse of frequency spectrum where possible given the location of the cells 109. The cellular topology 442 may be automatically generated given a site survey. In some cases, the number of cells 109 in the cellular topology 442 may be automatically determined based on a desired geographic area 312 to be covered, availability of backhaul connectivity at various sites, signal propagation, available frequency spectrum, and/or on other parameters. For radio-based networks 103, the cellular topology 442 may be developed to cover one or more buildings in an organizational campus, one or more schools in a school district, one or more buildings in a university or university system, and other areas. The cellular topology 442 may be determined such that the cells 109 remain within one or more geographic areas 312 specified by the locality rules 434.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based network 103. This device data 448 includes corresponding users, account information, billing information, data plan, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on. The device data 448 may be subject to data storage requirements in the locality rules 434 such that the device data 448 is required to be stored within one or more particular geographic areas 312.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware. The customer billing data 454 may be subject to data storage requirements in the locality rules 434 such that the customer billing data 454 is required to be stored within one or more particular geographic areas 312.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances or containers located in computing devices 418 that are at cell sites, at customer aggregation sites, or in data centers remotely located from the customer. The locations of the network functions may be controlled at least in part by the locality rules 434. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421. For example, the customer workloads 469 may provide or support a customer application or service. In various examples, the customer workloads 469 relate to factory automation, autonomous robotics, augmented reality, virtual reality, design, surveillance, and so on.

The network slices 470 correspond to flows of network traffic that have been designated for one or more locality rules 434 and/or one or more specific quality-of-service requirements 471. The flows may correspond to flows associated with a specific application executed on a specific client device 406, all network traffic from a specific client device 406, flows to a specific destination from all client devices 406, flows to a specific destination from a specific client device 406, flows of a specific type of traffic (e.g., voice calls, video, text messages, general data, etc.), and so forth. In one example, a network slice 470 is identified by a source port, a source network address, a destination port, a destination network address, and/or other information. A network slice 470 may be valid for a specific period of time or for a specific quantity of data, or the network slice 470 may be valid until cancelled or released. In one example, a network slice 470 is allocated on-demand for a specific application executed on a client device 406. In some scenarios, a network slice 470 has specific recurring time periods of validity (e.g., every weeknight from midnight to 5 a.m.), or the quality-of-service requirement 471 for a network slice 470 may change based upon recurring time periods, current cost level, and/or other factors or events.

The quality-of-service requirement 471 may correspond to a minimum or maximum bandwidth, a minimum or maximum latency, a minimum or maximum reliability measure, a minimum or maximum signal strength, and so on. The quality-of-service requirement 471 may be associated with a corresponding level of cost, which may include a fixed component, a usage-based component, and/or a congestion-based component. For example, a quality-of-service requirement 471 may be associated with a recurring monthly fixed cost, a per-session or per-megabyte cost, and/or a dynamic cost based upon congestion at a cell site or a particular network link. In some cases, customers may select a quality-of-service requirement 471 that provides a high level of service. In other cases, however, customers may select a quality-of-service requirement 471 that provides a low level of cost but lowers the quality-of-service during certain times or in certain aspects. For example, a customer may choose a quality-of-service requirement 471 that allows for high throughput overnight and otherwise lower priority throughput in order to send backup data over the network at a low cost.

The locality rules 434 are customer-specified rules that at least a subset of network traffic on a radio-based network 103 operated for the customer, or network traffic on a network slice 470 on the radio-based network 103, remain within one or more particular geographic areas 312. The locality rules 434 may include identifications of one or more geographic areas 312 with predefined boundaries, such as countries, states, cities, postal codes, trade areas, etc. In some cases, the locality rules 434 may include an arbitrarily defined geographic area 312, such as a distance from a location, metes and bounds, cells within a grid, and so on, which may correspond to an organizational campus or other area. In addition to defining the geographic area(s) 312, the locality rules 434 may specify times, events, or seasons of applicability; procedures for requesting and approving exceptions; types or classes of network traffic to which the locality rules 434 apply; users, devices, or applications to which the locality rules 434 apply; allowable uses of network traffic or metadata outside of the geographic areas 312 (e.g., storing charging records outside of the geographic areas 312 may be considered acceptable or not acceptable); and other parameters.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' private networks. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5:
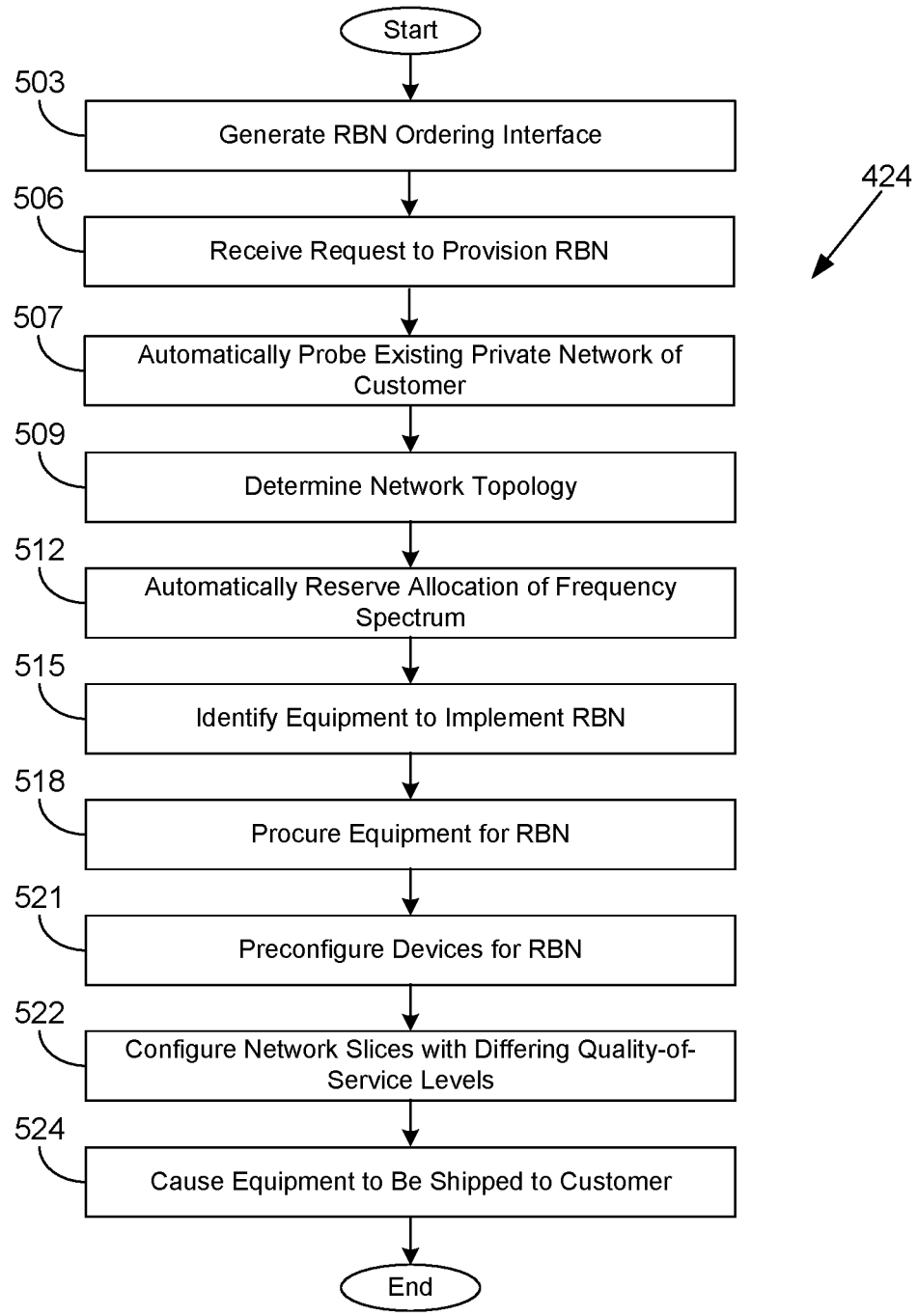
FIG. 5 is a flowchart illustrating an example of functionality implemented as portions of a radio-based network management service executed in a computing environment in the networked environment of FIG. 4 according to various embodiments of the present disclosure.

Referring next to FIG. 5, shown is a flowchart that provides one example of the operation of a portion of the RBN management service 424 according to various embodiments. It is understood that the flowchart of FIG. 5 provides merely an example of the many different types of functional arrangements that may be employed to implement the operation of the portion of the RBN management service 424 as described herein. As an alternative, the flowchart of FIG. 5 may be viewed as depicting an example of elements of a method implemented in the computing environment 403 (FIG. 4) according to one or more embodiments.

Beginning with box 503, the RBN management service 424 generates a user interface for ordering or provisioning an RBN 103 (FIG. 1A). For example, the user interface may include components for specifying a network plan 439 (FIG. 4) or parameters for a network plan 439. Such parameters may include, for example, a number of cells, a map or site plan of the customer's premises or geographic area to be covered, a target bandwidth, information about wireless devices 106 (FIG. 1A) or users, a target minimum latency, a desired cost, and/or other parameters. The user interface may include components for uploading one or more data files that include this information. The user interface may be sent as a network page or other network data over the network 412 (FIG. 4) for rendering by a client application 436 (FIG. 4) executed in a client device 406 (FIG. 4). Alternatively, a client application 436 may make one or more API calls in order to place an order for or to provision an RBN from a provider.

In box 506, the RBN management service 424 receives a request to provision an RBN from an organization. For example, a user may submit a form or otherwise interact with a user interface to cause a request to be submitted. Alternatively, the client application 436 may make one or more API calls in order to request to provision the RBN.

In box 507, the RBN management service 424 may automatically initiate a probe of an existing private network of the organization. For example, organizations may have an existing network, such as a wired, ethernet network, a Wi-Fi network, or another type of network. Upon receiving appropriate security credentials and access to an endpoint on the network, the RBN management service 424 may automatically probe the network to ascertain customer requirements for a new RBN 103 and the associated core network. For example, the RBN management service 424 may automatically determine a quantity of user devices on the existing network, network bandwidth and request volume associated with various applications or services, existing latency observed for accessing the various applications or services, reliability of existing systems, and so forth. These observations may be used to set initial thresholds for latency, bandwidth, etc., in the RBN to be deployed.

In box 509, the RBN management service 424 determines a network topology for the RBN 103. For example, the network topology may be based at least in part on one or more locality rules 434 (FIG. 4). The network topology may include an arrangement of cells 109 (FIG. 1A) in the RBN 103. The arrangement may be determined to optimally cover one or more buildings of an organization. Both internal areas of the buildings and external areas may be covered as desired. This determination may include receiving information with respect to the coverage area, including indoor and outdoor coverage areas, the number of devices to be connected, and layout of the physical network connectivity and power sources. In this regard, the RBN management service 424 may determine a number of cells 109 from the network plan 439. Alternatively, the RBN management service 424 may automatically determine an optimal number of cells 109 based at least in part on parameters such as target latency, bandwidth, signal strength, and reliability, in view of the area and/or premises of the customer to be covered. In one embodiment, an unmanned aerial vehicle may be used in order to make a site survey of the area to be covered, potentially recording signal strengths to observe a status of a frequency spectrum to determine available frequencies. The RBN management service 424 may record the arrangement of cells 109 in the cellular topology 442 (FIG. 4). In some scenarios, the RBN management service 424 may use machine learning to determine the optimal arrangement of cells 109 by deploying various arrangements for RBNs 103 and assessing performance. Over time by observing these deployments, the RBN management service 424 can learn which arrangements perform better or worse than others and use these results to train a machine learning model.

In box 512, the RBN management service 424 automatically reserves an allocation of frequency spectrum for the RBN 103. To this end, the RBN management service 424 may automatically determine available frequencies for the cellular topology 442 from publicly available frequencies, customer-owned frequencies, and/or provider-owned frequencies. The frequency determination may take into account polarization, directionality, beam tilt, and/or other factors that may allow or interfere with frequency reuse. The RBN management service 424 may record the reservation in the spectrum assignments 445 (FIG. 4). Additionally, the RBN management service 424 may communicate with an external service via the network 412, such as the spectrum reservation service 410 (FIG. 4), that implements a reservation system for frequency spectrum, to make the reservation and/or to determine available frequencies.

In box 515, the RBN management service 424 identifies equipment necessary to implement the RBN 103 according to the network topology that complies with the locality rules 434. This may include antennas, radio units, computing devices to implement provider substrate extensions 224 (FIG. 2A), cables, switches, routers, fiber termination gear, and so on. In some cases, the computing devices may be included in an exterior unit to be installed outside of a customer's building. Such units may be self-contained except for power and network connections in some examples. In some scenarios, the RBN management service 424 may use machine learning to determine an optimal arrangement of equipment by deploying various arrangements for RBNs 103 and assessing performance. Over time by observing these deployments, the RBN management service 424 can learn which arrangements perform better or worse than others and use these results to train a machine learning model.

The RBN management service 424 may also determine through machine learning an optimal distribution of equipment for various customers. For example, it may make sense to run network function workloads 466 (FIG. 4) for a particular type of customer only in the data center core computing devices 118 (FIG. 1A), while for another type of customer, it may be optimal to run the network function workloads 466 at the distributed computing devices 112 (FIG. 1A) or the centralized computing devices 115 (FIG. 1A). Thus, the RBN management service 424 may determine not to deploy computing devices 112 or 115 in favor of a cloud-only deployment of core computing devices 118.

In box 518, the RBN management service 424 initiates procurement of the equipment for the RBN 103 via the RBN hardware deployment service 430 (FIG. 4). This may include reserving the equipment automatically from an existing inventory of the provider, and/or placing one or more orders for the equipment from one or more vendors.

In box 521, the RBN management service 424 causes the RBN hardware configuration service 427 (FIG. 4) to preconfigure one or more devices, such as computing devices to implement network functions, radio units, antennas, routers, etc. Such devices may be connected to the network 412 as the predeployed devices 409 (FIG. 4). The RBN hardware configuration service 427 uses the radio unit configuration data 457 (FIG. 4), the antenna configuration data 460 (FIG. 4), and the network function configuration data 463 (FIG. 4) to implement the preconfigurations.

In box 522, the RBN management service 424 may configure one or more network slices for the radio-based network 103 that may provide differentiated quality-of-service levels for different user devices, applications, or services. The quality-of-service levels may provide different latency, bandwidth/throughput, signal strength, reliability, and/or other service factors. For example, the customer may have a set of devices that require very low latency, so the RBN management service 424 may configure a network slice that provides latency under a threshold for those devices. In another example, a first quality-of-service level may be provided for a first application, and a second quality-of-service level may be provided for a second application.

In box 524, the RBN management service 424 causes the RBN hardware deployment service 430 to ship the equipment, including the preconfigured, predeployed devices 409 to the customer. Various instructions for installing the equipment may be transmitted to the customer via the client application 436. Thereafter, the operation of the portion of the RBN management service 424 ends.

Figure 6A:
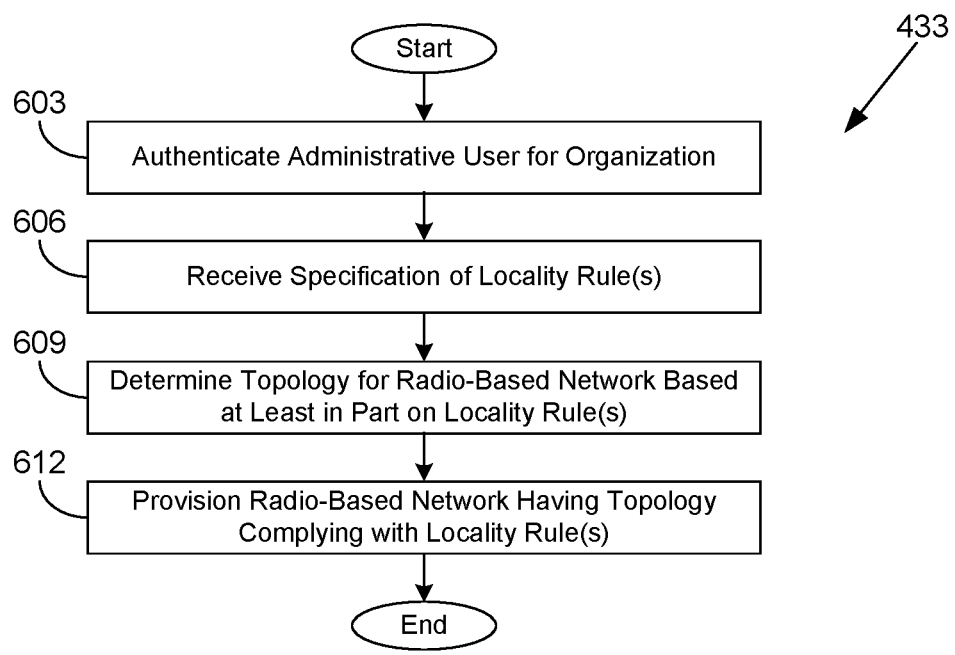
FIGS. 6A, 6B, and 7 are flowcharts illustrating examples of functionality implemented as portions of a locality orchestration service executed in a computing environment in the networked environment of FIG. 4 according to various embodiments of the present disclosure.

Moving on to FIG. 6A, shown is a flowchart that provides one example of the operation of a portion of the locality orchestration service 433 according to various embodiments. It is understood that the flowchart of FIG. 6A provides merely an example of the many different types of functional arrangements that may be employed to implement the operation of the portion of the locality orchestration service 433 as described herein. As an alternative, the flowchart of FIG. 6A may be viewed as depicting an example of elements of a method implemented in the computing environment 403 (FIG. 4) according to one or more embodiments.

Beginning with box 603, the locality orchestration service 433 authenticates an administrative user of an organization at a client device 406 (FIG. 4). In box 606, the locality orchestration service 433 receives a specification of one or more locality rules 434 (FIG. 4). For example, the administrative user may specify one or more geographic areas 312 (FIG. 3) by selecting or identifying one or more predefined geographic areas 312 (e.g., countries, states, cities, postal codes, etc.) or by arbitrarily defining a geographic area 312 by way of distance from a location, metes and bounds, cells on a grid, etc. The user may also indicate various parameters controlling types of network traffic to which the locality rules 434 are applicable, when and under what conditions the locality rules 434 apply, exception mechanisms, what user records (e.g., subscriber data, keys, text messages, voicemails, charging records, etc.) are to remain in the geographic area 312, and so on.

In box 609, the locality orchestration service 433 determines a network topology for a radio-based network 103 (FIG. 1A) based at least in part on the locality rules 434 such that the elements of the radio-based network 103 are entirely within the geographic areas 312. In some cases, the locality orchestration service 433 may access a previously defined locality rule 434 or a locality rule 434 that is preconfigured by a cloud provider instead of the organization.

The topology may include elements of the radio-based network 103 such as communication links (e.g., links between the RAN and the associated core network), provider substrate extensions 224 (FIG. 2A) or other capacity of a cloud provider network 203 (FIG. 2A) upon which network functions are executed or data or metadata is stored, cell 109 (FIG. 1A) locations, and other elements. In some cases, the user may provide a topology specification such as in Topology Orchestration Specification for Cloud Applications (TOSCA) or in another format such as JavaScript Object Notation (JSON) and so forth. The locality orchestration service 433 may also automatically generate a topology specification in such a format in some embodiments. For example, the locality rules 434 may require that one or more identified classes of network traffic (e.g., voice, video, text messages, data) remain within the geographic area 312.

In various embodiments, the locality orchestration service 433 may select a location for deployment of a cell 109 of the RBN 103 based at least in part on the cell 109 being within the geographic area 312; select a location for deployment of a provider substrate extension 224 of a cloud provider network 203 based at least in part on the location being within the geographic area 312; select a first region 306 (FIG. 3) (or local zone) out of a plurality of regions 306 (or local zones) of a cloud provider network 203 for deployment of at least a portion of the associated core network based at least in part on the first region 306 being within the geographic area 312 (as compared to a second region 306 that is outside of the geographic area 312); select a particular communication link to connect the RAN and the associated core network based at least in part on the particular communication link being entirely within the geographic area 312; select a particular data storage service to store data records associated with the RBN 103 based at least in part on the particular data storage service being within the particular geographic area 312; and so on.

In box 612, the locality orchestration service 433 initially provisions the radio-based network 103 having the topology complying with the locality rules 434, or reconfigures an existing radio-based network 103 to have the complying topology. The radio-based network 103 may be configured to enforce the locality rules 434 by way of firewall rules, network access control lists, security groups, and/or other mechanisms, to ensure that data does not exit a secure virtual private cloud network within a cloud provider network 203. The locality orchestration service 433 may also determine or verify that the generated topology complies with the locality rules 434. At least a portion of the radio-based network 103 is provisioned in a cloud provider network 203. Thereafter, the operation of the locality orchestration service 433 ends.

Figure 6B:
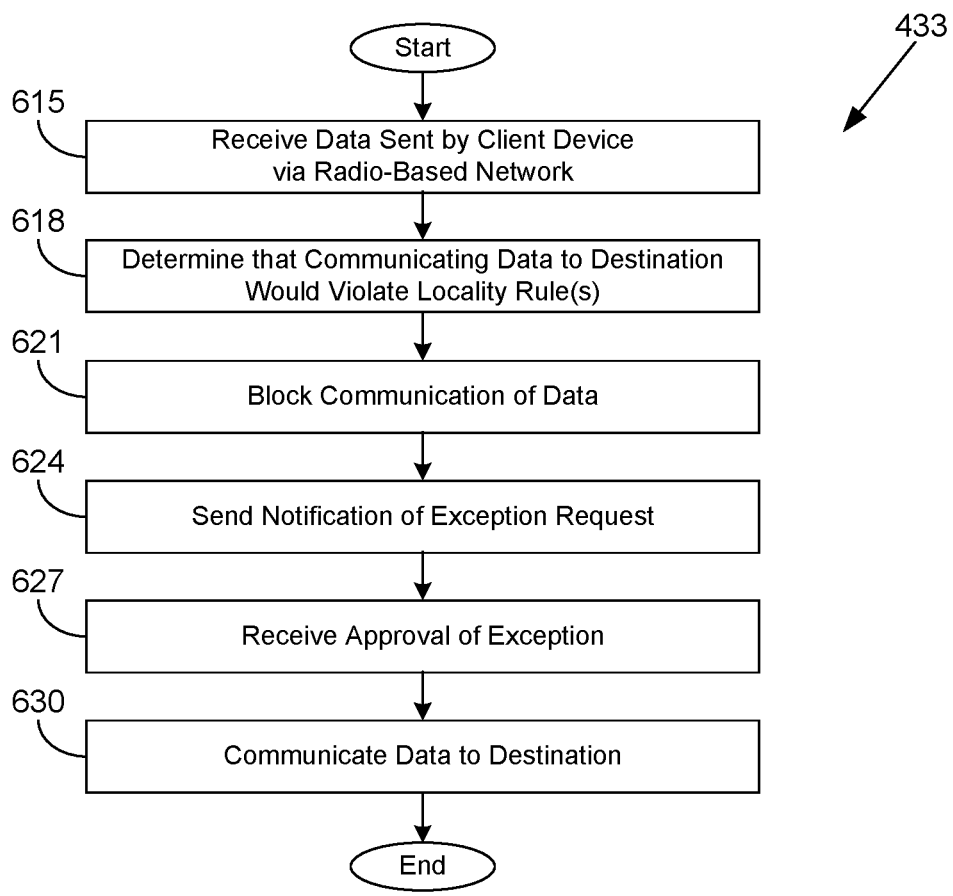

Turning to FIG. 6B, shown is a flowchart that provides one example of the operation of another portion of the locality orchestration service 433 according to various embodiments. It is understood that the flowchart of FIG. 6B provides merely an example of the many different types of functional arrangements that may be employed to implement the operation of the portion of the locality orchestration service 433 as described herein. As an alternative, the flowchart of FIG. 6B may be viewed as depicting an example of elements of a method implemented in the computing environment 403 (FIG. 4) according to one or more embodiments.

Beginning with box 615, the locality orchestration service 433 or another component of the RBN 103 (FIG. 1A) receives data sent by a client device 406 (FIG. 4) via the RBN 103. Alternatively, the data may be sent by another computing device inside or outside of the RBN 103 to the client device 406. The data may correspond to control plane data (e.g., device registration data, authentication data, etc.), user plane data (e.g., voice call data, text message data, etc.), or a combination of both. In box 618, the locality orchestration service 433 determines that communicating the data to a destination would violate one or more locality rules 434 (FIG. 4) configured for the RBN 103. For example, the destination may be outside of a particular geographic area 312 (FIG. 3) specified in the locality rules 434, and the locality rule 434 would otherwise apply to the type of data being sent. In another example, the locality orchestration service 433 may determine that at least a portion of a route of the data to the destination is outside of the particular geographic area 312, or the data would be processed in some way outside of the particular geographic area 312. If the data is incoming data, the source may be outside of the particular geographic area 312, while the destination may be inside the particular geographic area 312, thereby violating the locality rule 434 from an incoming direction.

In box 621, the locality orchestration service 433 implements one or more actions in response to determining that communicating the data to the destination would violate one or more locality rules 434. For example, the locality orchestration service 433 may block the communication of the data to the destination pending approval of an exception to the locality rule 434. In other examples, violating the locality rule(s) 434 may trigger a lawful interception of the data, cause throttling or slowing down communication of the data, cause disabling throttling of the data, generate notifications or log entries, and/or cause other actions to be performed. In some cases, a type of processing (e.g., logging, transcoding, intercepting, etc.) is normally performed on network traffic that complies with a locality rule 434, but the processing is not performed on network traffic that does not comply with the locality rule 434.

In box 622, the locality orchestration service 433 determines whether to request an exemption to the locality rule 434. In some examples, an exception may be approved automatically in some or all cases in response to detected resource constraints that would not otherwise allow the communication to go through. In other cases, one or more notifications for an exemption request are selectively sent according to a configured policy. If the locality orchestration service 433 determines to request an exception, in box 624, the locality orchestration service 433 sends a notification of an exception request for an exception to the locality rule 434. In some cases, the locality orchestration service 433 may send the notification to an administrative user of the organization for which the RBN 103 is provisioned. In other cases, the user at the client device 406 may be sent the notification and may be able to approve the exception request. In some cases, approval of an exception may be required of users on both ends of a data connection (e.g., a voice call, text message, or other data exchange).

In box 627, the locality orchestration service 433 determines whether required approval(s) are received. If the locality orchestration service 433 receives approval of the exception via a user interface or application programming interface (API) from the client device 406 or a client device 406 of an administrative user, the locality orchestration service 433 continues from box 627 to box 630. In box 630, the locality orchestration service 433 proceeds with communicating the data to the destination. Thereafter, the operation of the portion of the locality orchestration service 433 ends. If approvals are not received in box 627, or if no exemption is requested in box 622, the operation of the portion of the locality orchestration service 433 also ends.

Figure 7:
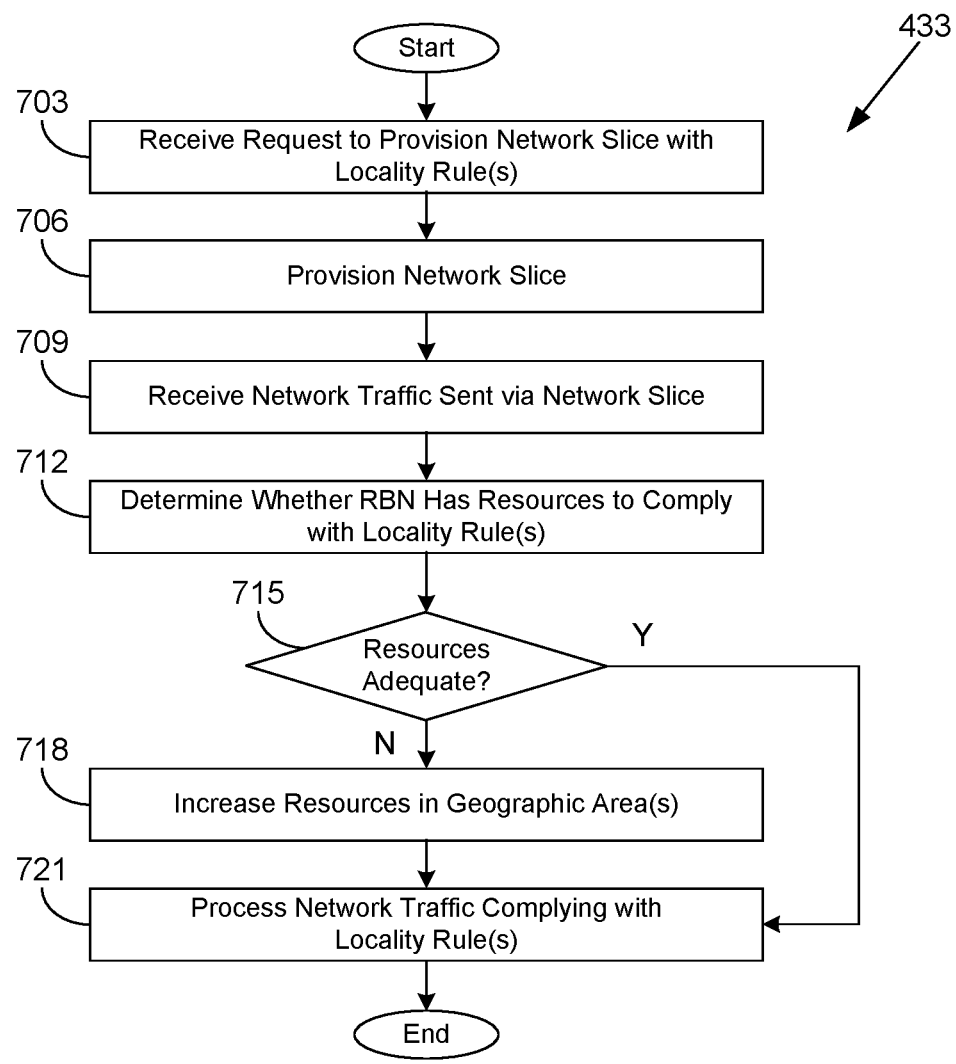

Referring next to FIG. 7, shown is a flowchart that provides one example of the operation of another portion of the locality orchestration service 433 according to various embodiments. It is understood that the flowchart of FIG. 7 provides merely an example of the many different types of functional arrangements that may be employed to implement the operation of the portion of the locality orchestration service 433 as described herein. As an alternative, the flowchart of FIG. 7 may be viewed as depicting an example of elements of a method implemented in the computing environment 403 (FIG. 4) according to one or more embodiments.

Beginning with box 703, the locality orchestration service 433 receives a request to provision a network slice 470 (FIG. 4) with one or more locality rules 434 (FIG. 4). The request to provision the network slice 470 may include a definition of a particular geographic area 312 (FIG. 3) for the locality rules 434. In box 706, the locality orchestration service 433 provisions the network slice 470 using the network slice allocation service 425 (FIG. 4) so that the network slice 470 can be implemented with a topology that complies with the locality rules 434. For example, the locality orchestration service 433 may deploy one or more provider substrate extensions 224 (FIG. 2A) of the cloud provider network 203 (FIG. 2A) within the particular geographic area 312. The locality orchestration service 433 may configure the RBN 103 (FIG. 1A) to store data records relating to the network traffic of the network slice 470 in a data storage service within the geographic area 312. The RBN 103 may have one or more other network slices 470 that do not have the locality rules 434 or have different locality rules 434.

In box 709, the locality orchestration service 433 receives network traffic sent via the network slice 470. The locality orchestration service 433 may determine that the network traffic is sent via the network slice 470 based at least on at least one of a source application of the network traffic, a source client device of the network traffic, or a tag in the network traffic. In some cases, the network traffic is to be sent to a destination outside of the geographic area 312 specified in the locality rules 434, in which case the network traffic may be blocked until an appropriate exception is approved.

In box 712, the locality orchestration service 433 determines whether the RBN 103 has the resources to comply with the locality rules 434 in processing the network traffic. In box 715, the locality orchestration service 433 assesses whether the resources are adequate (e.g., meeting a threshold for quality-of-service requirements 471 (FIG. 4)).

If the resources are not determined to be adequate, the locality orchestration service 433 proceeds from box 715 to box 718 and increases resources in a geographic area 312 specified in the locality rules 434. That is to say, the locality orchestration service 433 may scale computing resources allocated to the network slice 470 within the geographic area 312. For example, the locality orchestration service 433 may allocate one or more additional instances of a network function in the particular geographic area 312, increase capacity of a communication link in the particular geographic area 312, etc. The locality orchestration service 433 then proceeds to box 721. If the resources in the geographic area 312 are determined to be adequate, the locality orchestration service 433 proceeds from box 715 to box 721.

In some cases, the locality orchestration service 433 may be unable to scale the resources in the particular geographic area 312. For example, resources may be unavailable. In such scenarios, the locality orchestration service 433 may drop the traffic, request an exception to the locality rule 434, or automatically apply an exception to the locality rule 434.

In box 721, if the resources are adequate or are scaled to be adequate, the locality orchestration service 433 acts upon the network traffic to process the network traffic in the geographic area 312 complying with the locality rules 434. For example, the locality orchestration service 433 may select a route for the network traffic in the RBN 103 in order to comply with the locality rules 434. The locality orchestration service 433 may select a particular instance of a network function (e.g., AMF, SMF, UPF, etc.) to process the network traffic, where the particular instance being selected from a plurality of instances of the network function in the RBN 103 based at least in part on the particular instance being within the particular geographic area 312. The locality orchestration service 433 may also select particular base stations or a group of base stations in a RAN so that the base stations are within the particular geographic area 312 and are used for the network traffic. The locality orchestration service 433 may also select for the route a particular communication link between the RAN and the associated core network, where an entirety of the particular communication link is within the particular geographic area 312. Thereafter, the operation of the portion of the locality orchestration service 433 ends.

Figure 8:
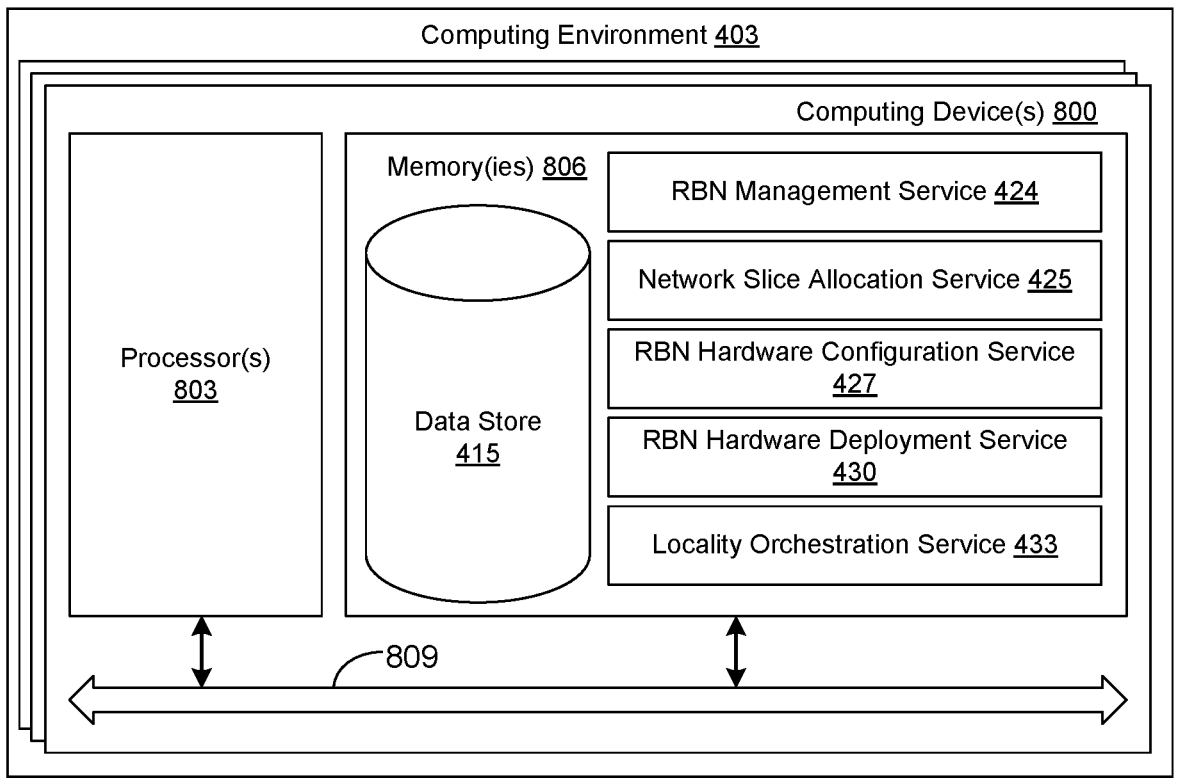
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the RBN management service 424, the network slice allocation service 425, the RBN hardware configuration service 427, the RBN hardware deployment service 430, the locality orchestration service 433, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the RBN management service 424, the network slice allocation service 425, the RBN hardware configuration service 427, the RBN hardware deployment service 430, the locality orchestration service 433, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show the functionality and operation of an implementation of portions of the RBN management service 424 and the locality orchestration service 433. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RBN management service 424, the network slice allocation service 425, the RBN hardware configuration service 427, the RBN hardware deployment service 430, and the locality orchestration service 433, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RBN management service 424, the network slice allocation service 425, the RBN hardware configuration service 427, the RBN hardware deployment service 430, and the locality orchestration service 433, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described by at least the following clauses:

Clause 1. A system, comprising: at least one computing device in a cloud provider network configured to at least: receive a request to provision a radio-based network for an organization, the radio-based network comprising a radio access network and an associated core network, at least a portion of the associated core network to be provisioned in the cloud provider network; determine a topology for the radio-based network that complies with at least one locality rule requiring that one or more identified classes of network traffic for the radio-based network remain within a particular geographic area, such that a portion of the topology corresponding to a portion of the radio-based network that handles the one or more identified classes of network traffic consists of physical hardware located within the particular geographic area; and provision, for the organization, the radio-based network having the topology complying with the at least one locality rule.

Clause 2. The system of clause 1, wherein the at least one computing device is further configured to at least: receive a specification of the at least one locality rule from a client device associated with the organization; and receive an arbitrary definition of the particular geographic area from the client device.

Clause 3. The system of clauses 1 to 2, wherein the topology defines at least one communication link entirely within the particular geographic area between the radio access network and the associated core network.

Clause 4. A computer-implemented method, comprising: accessing at least one locality rule associated with an organization, the at least one locality rule requiring that at least a subset of network traffic for a radio-based network remain within a particular geographic area, the radio-based network including a radio access network and an associated core network; determining a topology for the radio-based network based at least in part on the at least one locality rule; and provisioning or reconfiguring, for the organization, the radio-based network to have the topology complying with the at least one locality rule.

Clause 5. The computer-implemented method of clause 4, further comprising receiving the at least one locality rule from a client device associated with the organization.

Clause 6. The computer-implemented method of clauses 4 to 5, wherein determining the topology for the radio-based network based at least in part on the at least one locality rule further comprises: selecting a location for deployment of a cell of the radio access network based at least in part on the cell being within the particular geographic area.

Clause 7. The computer-implemented method of clauses 4 to 6, wherein determining the topology for the radio-based network based at least in part on the at least one locality rule further comprises: selecting a location for deployment of a provider substrate extension of a cloud provider network based at least in part on the location being within the particular geographic area.

Clause 8. The computer-implemented method of clauses 4 to 7, wherein determining the topology for the radio-based network based at least in part on the at least one locality rule further comprises: selecting a first region of a plurality of regions of a cloud provider network for deployment of at least a portion of the associated core network based at least in part on the first region being within the particular geographic area, wherein at least a second region of the plurality of regions is outside of the particular geographic area.

Clause 9. The computer-implemented method of clauses 4 to 8, wherein determining the topology for the radio-based network based at least in part on the at least one locality rule further comprises: selecting a particular communication link to connect the radio access network and the associated core network based at least in part on the particular communication link being entirely within the particular geographic area.

Clause 10. The computer-implemented method of clauses 4 to 9, wherein determining the topology for the radio-based network based at least in part on the at least one locality rule further comprises: selecting a particular data storage service to store data records associated with the radio-based network based at least in part on the particular data storage service being within the particular geographic area.

Clause 11. The computer-implemented method of clauses 4 to 10, wherein the at least one locality rule requires that one or more user records associated with the radio-based network remain within the particular geographic area.

Clause 12. The computer-implemented method of clauses 4 to 11, wherein the at least one locality rule requires that one or more identified classes of the network traffic remain within the particular geographic area, the one or more identified classes comprising at least one of: voice calls, text messages, or data.

Clause 13. The computer-implemented method of clauses 4 to 12, further comprising receiving an arbitrary definition of the particular geographic area from a client device associated with the organization.

Clause 14. The computer-implemented method of clauses 4 to 13, wherein the particular geographic area comprises a plurality of specified geographic areas.

Clause 15. The computer-implemented method of clauses 4 to 14, wherein the particular geographic area corresponds to at least one of: a country, a state, a city, or a postal code.

Clause 16. A computer-implemented method, comprising: receiving data sent via a radio-based network operated for an organization, the radio-based network including a radio access network and an associated core network, the radio-based network implementing at least one locality rule requiring that at least a subset of network traffic for the radio-based network remain within a particular geographic area; determining that communicating the data to a destination would violate the at least one locality rule; and implementing one or more actions in response to determining that communicating the data to the destination would violate the at least one locality rule.

Clause 17. The computer-implemented method of clause 16, wherein the one or more actions comprise at least one of: blocking communicating the data to the destination, causing a lawful interception of the data, or causing the data to be throttled.

Clause 18. The computer-implemented method of clauses 16 to 17, further comprising: sending a notification to a user; receiving the approval of the exception to the at least one locality rule from the user; and communicating the data to the destination in response to the approval of the exception to the at least one locality rule.

Clause 19. The computer-implemented method of clauses 16 to 18, wherein determining that communicating the data to the destination would violate the at least one locality rule further comprises determining that the destination is outside of the particular geographic area.

Clause 20. The computer-implemented method of clauses 16 to 19, wherein determining that communicating the data to the destination would violate the at least one locality rule further comprises determining that at least a portion of a route of the data to the destination is outside of the particular geographic area.

Clause 21. A system, comprising: a radio-based network comprising a radio access network and an associated core network, at least a portion of the associated core network being provisioned in a cloud provider network; and at least one computing device in the cloud provider network configured to at least: receive a request to provision a network slice in the radio-based network, the network slice being associated with at least one locality rule requiring that data sent via the network slice remain within a particular geographic area; provision the network slice in the radio-based network in compliance with the at least one locality rule by using physical hardware located within the particular geographic area; receive network traffic sent via the network slice; and process the network traffic in the radio-based network within the particular geographic area in order to comply with the at least one locality rule.

Clause 22. The system of clause 21, wherein the at least one computing device is further configured to at least scale computing resources allocated to the network slice within the particular geographic area based at least in part on a utilization of the network slice.

Clause 23. The system of clauses 21 to 22, wherein provisioning the network slice in the radio-based network further comprises deploying at least one provider substrate extension within the particular geographic area in response to the request.

Clause 24. The system of clauses 21 to 23, wherein the request to provision the network slice includes a definition of the particular geographic area.

Clause 25. The system of clauses 21 to 24, wherein the at least one computing device is further configured to at least store data records relating to the network traffic in a data storage service within the particular geographic area.

Clause 26. The system of clauses 21 to 25, wherein at least one other network slice in the radio-based network is unassociated with the at least one locality rule.

Clause 27. The system of clauses 21 to 26, wherein the at least one computing device is further configured to at least: receive other network traffic sent via the network slice to a destination outside of the particular geographic area; and block communicating the other network traffic to the destination pending an approval of an exception to the at least one locality rule.

Clause 28. A computer-implemented method, comprising: receiving network traffic via a network slice in a radio-based network, the radio-based network including a radio access network and an associated core network, the network slice being associated with at least one locality rule requiring that the network traffic remain within a particular geographic area; determining that the radio-based network has resources to comply with the at least one locality rule; and acting upon the network traffic in the radio-based network in order to comply with the at least one locality rule.

Clause 29. The computer-implemented method of clause 28, further comprising storing data records associated with the network traffic within the particular geographic area in order to comply with the at least one locality rule.

Clause 30. The computer-implemented method of clauses 28 to 29, further comprising: receiving other network traffic via the network slice in the radio-based network; determining that the radio-based network does not have the resources to comply with the at least one locality rule with respect to routing the other network traffic; and sending a notification to a user device indicating that an exception to the at least one locality rule is necessary to route the other network traffic.

Clause 31. The computer-implemented method of clauses 28 to 30, further comprising: receiving other network traffic via a different network slice in the radio-based network, the different network slice being unassociated with the at least one locality rule; and selecting a different route for the other network traffic in the radio-based network in which the other network traffic exits the particular geographic area.

Clause 32. The computer-implemented method of clauses 28 to 31, further comprising determining that the network traffic is sent via the network slice based at least in part on at least one of: a source application of the network traffic, a source client device of the network traffic, or a tag in the network traffic.

Clause 33. The computer-implemented method of clauses 28 to 32, wherein determining that the radio-based network has the resources to comply with the at least one locality rule further comprises allocating one or more additional resources to the radio-based network in the particular geographic area in order to comply with the at least one locality rule.

Clause 34. The computer-implemented method of clauses 28 to 33, wherein acting upon the network traffic in the radio-based network in order to comply with the at least one locality rule further comprises selecting for a route a particular communication link between the radio access network and the associated core network, wherein an entirety of the particular communication link is within the particular geographic area.

Clause 35. The computer-implemented method of clauses 28 to 34, wherein acting upon the network traffic in the radio-based network in order to comply with the at least one locality rule further comprises selecting a particular instance of a network function to process the network traffic, the particular instance being selected from a plurality of instances of the network function in the radio-based network based at least in part on the particular instance being within the particular geographic area.

Clause 36. The computer-implemented method of clause 35, wherein at least one other instance of the plurality of instances of the network function in the radio-based network are outside of the particular geographic area.

Clause 37. A computer-implemented method, comprising: receiving network traffic via a network slice in a radio-based network, the radio-based network including a radio access network and an associated core network, the network slice being associated with at least one locality rule requiring that the network traffic remain within a particular geographic area; determining that a capacity of a network function in the particular geographic area is inadequate to process the network traffic; allocating one or more instances of the network function in the particular geographic area to increase the capacity; and processing the network traffic by the one or more instances of the network function in the particular geographic area in order to comply with the at least one locality rule.

Clause 38. The computer-implemented method of clause 37, wherein determining that the capacity of the network function in the particular geographic area is inadequate to process the network traffic further comprises: determining that an existing capacity of the network function in the radio-based network but outside of the particular geographic area cannot be used to process the network traffic based at least in part on the at least one locality rule.

Clause 39. The computer-implemented method of clauses 37 to 38, further comprising identifying the network slice based at least in part on at least one of: a source client device of the network traffic, a source application of the network traffic, or a tag in the network traffic.

Clause 40. The computer-implemented method of clauses 37 to 39, further comprising: determining that a capacity of a communications link in the particular geographic area is inadequate to transfer the network traffic; increasing the capacity of the communications link; and communicating the network traffic via the communications link in the particular geographic area in order to comply with the at least one locality rule.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device in a cloud provider network configured to at least:
receive a request to provision a radio-based network for an organization, the radio-based network comprising a radio access network and an associated core network, at least a portion of the associated core network to be provisioned in the cloud provider network;
determine a topology for the radio-based network that complies with at least one locality rule requiring that one or more identified classes of network traffic for the radio-based network remain within a particular geographic area, such that a portion of the topology corresponding to a portion of the radio-based network that handles the one or more identified classes of network traffic consists of physical hardware located within the particular geographic area; and
provision, for the organization, the radio-based network having the topology complying with the at least one locality rule.

2. The system of claim 1, wherein the at least one computing device is further configured to at least:
receive a specification of the at least one locality rule from a client device associated with the organization; and
receive an arbitrary definition of the particular geographic area from the client device.

3. The system of claim 1, wherein the topology defines at least one communication link entirely within the particular geographic area between the radio access network and the associated core network.

4. A computer-implemented method, comprising:
accessing at least one locality rule associated with an organization, the at least one locality rule requiring that at least a subset of network traffic for a radio-based network remain within a particular geographic area, the radio-based network including a radio access network and an associated core network;
determining a topology for the radio-based network based at least in part on the at least one locality rule, wherein determining the topology further comprises at least one of:
selecting a location for deployment of a provider substrate extension of a cloud provider network based at least in part on the location being within the particular geographic area;
selecting a first region of a plurality of regions of the cloud provider network for deployment of at least a portion of the associated core network based at least in part on the first region being within the particular geographic area, wherein at least a second region of the plurality of regions is outside of the particular geographic area;

selecting a particular communication link to connect the radio access network and the associated core network based at least in part on the particular communication link being entirely within the particular geographic area; or selecting a particular data storage service to store data records associated with the radio-based network based at least in part on the particular data storage service being within the particular geographic area; and provisioning or reconfiguring, for the organization, the radio-based network to have the topology complying with the at least one locality rule.

5. The computer-implemented method of claim 4, further comprising receiving the at least one locality rule from a client device associated with the organization.

6. The computer-implemented method of claim 4, wherein determining the topology for the radio-based network based at least in part on the at least one locality rule further comprises:

selecting a location for deployment of a cell of the radio access network based at least in part on the cell being within the particular geographic area.

7. The computer-implemented method of claim 4, wherein determining the topology for the radio-based network based at least in part on the at least one locality rule further comprises:

selecting the location for deployment of the provider substrate extension of the cloud provider network based at least in part on the location being within the particular geographic area.

8. The computer-implemented method of claim 4, wherein determining the topology for the radio-based network based at least in part on the at least one locality rule further comprises:

selecting the first region of the plurality of regions of the cloud provider network for deployment of the at least the portion of the associated core network based at least in part on the first region being within the particular geographic area.

9. The computer-implemented method of claim 4, wherein determining the topology for the radio-based network based at least in part on the at least one locality rule further comprises:

selecting the particular communication link to connect the radio access network and the associated core network based at least in part on the particular communication link being entirely within the particular geographic area.

10. The computer-implemented method of claim 4, wherein determining the topology for the radio-based network based at least in part on the at least one locality rule further comprises:

selecting the particular data storage service to store the data records associated with the radio-based network based at least in part on the particular data storage service being within the particular geographic area.

11. The computer-implemented method of claim 4, wherein the at least one locality rule requires that one or more user records associated with the radio-based network remain within the particular geographic area.

12. The computer-implemented method of claim 4, wherein the at least one locality rule requires that one or more identified classes of the network traffic remain within the particular geographic area, the one or more identified classes comprising at least one of: voice calls, text messages, or data.

13. The computer-implemented method of claim 4, further comprising receiving an arbitrary definition of the particular geographic area from a client device associated with the organization.

14. The computer-implemented method of claim 4, wherein the particular geographic area comprises a plurality of specified geographic areas.

15. The computer-implemented method of claim 4, wherein the particular geographic area corresponds to at least one of: a country, a state, a city, or a postal code.

16. A computer-implemented method, comprising:

receiving data sent via a radio-based network operated for an organization, the radio-based network including a radio access network and an associated core network, the radio-based network implementing at least one locality rule requiring that at least a subset of network traffic for the radio-based network remain within a particular geographic area;

determining that communicating the data to a destination would violate the at least one locality rule; and implementing one or more actions in response to determining that communicating the data to the destination would violate the at least one locality rule.

17. The computer-implemented method of claim 16, wherein the one or more actions comprise at least one of: blocking communicating the data to the destination, causing a lawful interception of the data, or causing the data to be throttled.

18. The computer-implemented method of claim 16, further comprising:

sending a notification to a user;

receiving the approval of the exception to the at least one locality rule from the user; and communicating the data to the destination in response to the approval of the exception to the at least one locality rule.

19. The computer-implemented method of claim 16, wherein determining that communicating the data to the destination would violate the at least one locality rule further comprises determining that the destination is outside of the particular geographic area.

20. The computer-implemented method of claim 16, wherein determining that communicating the data to the destination would violate the at least one locality rule further comprises determining that at least a portion of a route of the data to the destination is outside of the particular geographic area.

* * * * *